US012502664B2

(12) United States Patent
Hamzik et al.

(10) Patent No.: US 12,502,664 B2
(45) Date of Patent: Dec. 23, 2025

(54) MEMBRANES FOR ACID-SENSITIVE SOLVENTS

(71) Applicant: ENTEGRIS, INC., Billerica, MA (US)

(72) Inventors: James Hamzik, N Billerica, MA (US); Jad Ali Jaber, Westford, MA (US)

(73) Assignee: ENTEGRIS, INC., Billerica, MA (US)

( * ) Notice: Subject to any disclaimer, the term of this patent is extended or adjusted under 35 U.S.C. 154(b) by 180 days.

(21) Appl. No.: 17/543,362

(22) Filed: Dec. 6, 2021

(65) Prior Publication Data
US 2022/0184595 A1 Jun. 16, 2022

Related U.S. Application Data

(60) Provisional application No. 63/124,373, filed on Dec. 11, 2020.

(51) Int. Cl.
*B01J 39/05* (2017.01)
*B01D 69/02* (2006.01)
(Continued)

(52) U.S. Cl.
CPC ............. *B01J 39/05* (2017.01); *B01D 69/02* (2013.01); *B01D 71/261* (2022.08); *B01D 71/32* (2013.01);
(Continued)

(58) Field of Classification Search
None
See application file for complete search history.

(56) References Cited

U.S. PATENT DOCUMENTS

| 4,113,922 | A | | 9/1978 | D'Agostino |
| 4,758,347 | A | * | 7/1988 | Henz ................ C02F 1/441 |
| | | | | 210/639 |

(Continued)

FOREIGN PATENT DOCUMENTS

| CN | 1688624 A | 10/2005 |
| JP | 2003190949 A | 7/2003 |

(Continued)

OTHER PUBLICATIONS

Mahajan, Y et al.; "Self-Condensation of Cyclohexanone over Ion Exchange Resin Catalysts: Kinetics and Selectivity Aspects" Ind. Eng. Chem. Res., 2008, pp. 25-33, vol. 47, No. 1, Department of Chemical Engineering, Indian Institute of Technology Bombay, Powai, Mumbai, India, and Schenectady Herdillia Limited, Navi Mumbai, India.

(Continued)

*Primary Examiner* — Hayden Brewster

(57) ABSTRACT

This disclosure provides certain strong cation-modified ion exchange resins and membranes useful for carrying out the removal of metal and metal ion contaminants in fluid compositions. Filtered liquid compositions with significantly reduced amounts of metals can be used in a microelectronic manufacturing process, such as liquids for removing photoresist. The cation-modified ion exchange resins and membranes of the disclosure can be configured for use in a microelectronic manufacturing system, which can be utilized in the system as a point of use metal-removal feature for liquids entering the system. Advantageously, the filter materials and methods of this disclosure showed considerable improvement in preventing degradation and the formation of color bodies and dimeric and oligomeric materials from ketones (e.g., cyclohexanone) in the liquid composi- (Continued)

tions while not compromising the filter material's ability to remove undesired metal ions.

11 Claims, 1 Drawing Sheet

(51) Int. Cl.
  *B01D 71/26*  (2006.01)
  *B01D 71/32*  (2006.01)
  *B01J 47/12*  (2017.01)
  *C02F 1/42*  (2023.01)

(52) U.S. Cl.
  CPC ........... *B01J 47/12* (2013.01); *B01D 2325/16* (2013.01); *B01D 2325/42* (2013.01); *C02F 2001/425* (2013.01)

(56) References Cited

U.S. PATENT DOCUMENTS

| | | | |
|---|---|---|---|
| 5,350,714 | A | 9/1994 | Trefonas et al. |
| 2005/0167271 | A1* | 8/2005 | Gajek ........................ C02F 3/34 204/600 |
| 2011/0082264 | A1* | 4/2011 | Selifonov ............ C07D 493/22 549/267 |
| 2016/0060133 | A1* | 3/2016 | Vollmer .................. C02F 1/683 210/702 |
| 2018/0001277 | A1 | 1/2018 | Liu |
| 2018/0229186 | A1 | 8/2018 | Yandrasits et al. |
| 2019/0134570 | A1 | 5/2019 | Pintauro |
| 2020/0171442 | A1* | 6/2020 | Filipancic .............. B01D 69/02 |
| 2020/0360862 | A1* | 11/2020 | Kamimura ............. B01D 69/08 |
| 2022/0135445 | A1* | 5/2022 | Moore .................. C02F 1/4693 204/242 |

FOREIGN PATENT DOCUMENTS

| | | |
|---|---|---|
| JP | 2004330056 A | 11/2004 |
| JP | 2009039695 A | 2/2009 |
| JP | 2009110950 A | 5/2009 |
| TW | I710544 B | 11/2020 |
| WO | 0158576 W | 8/2001 |
| WO | 2015017972 A1 | 2/2015 |
| WO | 2017205722 A1 | 11/2017 |

OTHER PUBLICATIONS

Purolite C1500CHA, Polystyrenic Macroporous, Strong Acid Cation Resin, Cyclohexylamine form, Strongly Acidic; Product Data Sheet; Apr. 8, 2020, p. 1 of 1, Purolite, purolite.com.
Monazam, E. et al.; "Rate analysis of sorption of Ce+3, Sm+3, and Yb+3 ions from aqueous solution using Dowex 50W-X8 as a sorbent in a continuous flow reactor" National Energy Technology Laboratory, U.S. Department of Energy, pp. 1-19, downloaded from osti.gov-servlets-purl-1482360 on Dec. 9, 2020.
Product Information, Lewatit S 100 NH4; Lanxess, Business Unit Ion Exchange Resins, Oct. 13, 2011, pp. 1/4-4/4.
Kang et al., A facile method for the preparation of poly(vinylidene fluoride) membranes filled with cross-linked sulfonated polystyrene, Reactive and Functional Polymers, vol. 99, pp. 42-48, 2016.
L. S. Ettre, Nomenclature for Chromatography, Pure & Appl. Chem., vol. 65, No. 4, pp. 819-872, 1993.

\* cited by examiner

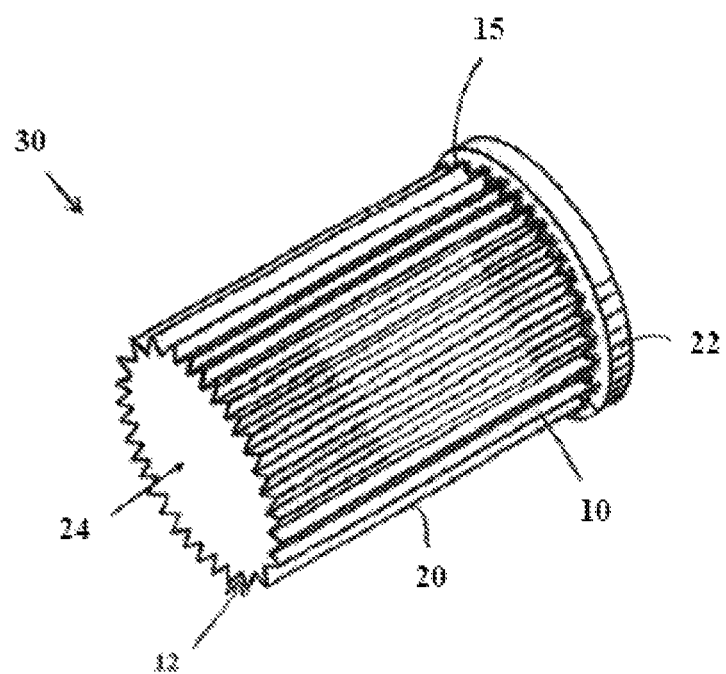

MEMBRANES FOR ACID-SENSITIVE SOLVENTS

CROSS-REFERENCE TO RELATED APPLICATIONS

This application claims the benefit under 35 USC 119 of U.S. Provisional Patent Application No. 63/124,373, filed Dec. 11, 2020, the disclosure of which is hereby incorporated herein by reference in its entirety.

TECHNICAL FIELD

The following description relates to modified filter materials, and to methods of using the materials for removing metals from liquid compositions comprising acid sensitive solvents such as ketones.

BACKGROUND

Filters are used to remove unwanted materials from a flow of a useful fluid and have become important features in a wide variety of industrial technologies. Fluids that are treated to remove unwanted materials include water, liquid industrial solvents and processing fluids, industrial gases used for manufacturing or processing, and liquids that have medical or pharmaceutical uses. Unwanted materials that are removed from fluids include impurities and contaminants such as particles, microorganisms, and dissolved chemical species. Specific examples of filter applications include their use with liquid materials for semiconductor and microelectronic device manufacturing.

Filters can remove unwanted materials by a variety of different ways, such as by size exclusion or by chemical and/or physical interaction with material. Some filters are defined by a structural material providing a porous architecture to the filter, and the filter is able to trap particles of a size that are not able to pass through the pores. Some filters are defined by the ability of the structural material of the filter, or of a chemistry associated with the structural material, to associate and interact with materials that pass over or through the filter. For example, chemical features of the filter may enable association with unwanted materials from a stream that passes over the filter, trapping those unwanted materials such as by ionic, coordinative, chelation, or hydrogen-bonding interactions. Some filters can utilize both size exclusion and chemical interaction features to remove materials from a filtered stream.

In some cases, to perform a filtration function, a filter includes a filter membrane that is responsible for removing unwanted material from a fluid that passes through. The filter membrane may, as required, be in the form of a flat sheet, which may be wound (e.g., spirally), flat, pleated, or disk-shaped. The filter membrane may alternatively be in the form of a hollow fiber. The filter membrane can be contained within a housing or otherwise supported so that fluid that is being filtered enters through a filter inlet and is required to pass through the filter membrane before passing through a filter outlet.

The removal of ionic materials such as dissolved anions or cations from solutions is important in many industries, such as the microelectronics industry, where ionic contaminants and particles in very small concentrations can adversely affect the quality and performance of microprocessors and memory devices. In particular, it may be desirable to remove metal-containing materials such as metal ions from liquid compositions that are used for device fabrication. Metal-containing materials can be found in different types of liquids that are used for microelectronic manufacturing.

There remain various unresolved technical challenges for the removal of metal-containing materials from fluids. In the case of purification of photochemicals, especially complex multicomponent compositions containing solvents, resist polymers, quenchers, surfactants, and photo acid generators (PAGs), there is a need for greater selectivity for removal of certain metal contaminants in the presence of such other components in the formulation, while at the same time, not contributing to the degradation or oligomerization of ketone solvents such as cyclohexanone as such solvents are prone to develop color bodies or form higher molecular weight condensation species such as dimers and oligomers upon exposure to strong acid functional cation exchange resins and membranes.

SUMMARY

This disclosure provides various inventive embodiments that are directed to the removal of metal contaminants from fluids, as well as strong cation-modified ion exchange resins and membranes useful for carrying out such methods. Filtered liquid compositions with significantly reduced amounts of metals can be used in a microelectronic manufacturing process, such as liquids for removing photoresist. The cation-modified ion exchange resins and membranes of the disclosure can be configured for use in a microelectronic manufacturing system, which can be utilized in the system as a point of use metal-removal feature for liquids entering the system. In general, the filter materials of the disclosure comprise strong cation exchange functional groups, such as sulfonic acid, which are subsequently reacted with a cation source such as ammonium hydroxide to provide an ammonium-functional ion exchange resin. Advantageously, the filter materials and methods of this disclosure showed considerable improvement in preventing degradation and the formation of color bodies and oligomeric materials from ketones (e.g., cyclohexanone) in the liquid compositions, hereinafter referred to as "dimeric and oligomeric condensation species", while not compromising the filter material's ability to remove undesired metal ions.

In one aspect, the disclosure provides a membrane comprising at least one strong acid functional group having a cationic counterion which is other than $H^+$. In another aspect, the disclosure provides a method of removing one or more metal(s) or metal ion(s) from a liquid composition, the method comprising:
  (i) contacting a filter material with a liquid composition comprising at least one ketone and one or more metals or metal ions, the filter material comprising at least one strong acid functional group having a cationic counterion which is other than H+; and
  (ii) reducing an amount of the one or more metals or metal ions in the liquid composition, thereby providing a purified liquid composition.

BRIEF DESCRIPTION OF THE DRAWINGS

The disclosure may be more completely understood in consideration of the following description of various illustrative embodiments in connection with the accompanying drawings FIG. 1 (which is schematic and not necessarily to scale) shows an example of a filter product as described herein.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

In certain embodiments of filter materials and methods of the present disclosure, the filter includes a porous filter membrane in the form of a non-woven fiber, with an ion exchange or chelating functional group (for example, sulfonic acid) attached to material that forms the membrane. As used herein, a "porous filter membrane" is a porous solid that contains porous (e.g., microporous) interconnecting passages that extend from one surface of the membrane to an opposite surface of the membrane. The passages generally provide tortuous tunnels or paths through which a liquid being filtered must pass. Metal species of sizes small enough to pass through the pores of the membrane can be trapped on the membrane by interaction with the ion exchange functional group, such as by a chelation interaction between the functional group and the metal. This is referred to as a "non-sieving filtration mechanism."

The filter materials and methods of the disclosure can also function to prevent any particles (e.g., metal containing particles) present within the liquid that are larger than the pores from entering the microporous membrane or can function to trap the particles within the pores of the microporous membrane (i.e., wherein particles are removed by a sieving-type filtration mechanism). The liquid to be treated can pass through the membrane resulting in flow-through having a reduced amount of metals, such as a reduced amount of ionic metal species, a reduced amount of metal-containing particulates, or both.

Accordingly, a porous polymeric membrane of the disclosure can remove metal and metal ion contaminants in a solution that is passing through the membrane, as well as any material that is of a size too large to pass through the pores of the membrane. The disclosure illustrates various embodiments for methods of removing metal contaminants from fluids, wherein the filter material is comprised of a cation exchange resin which has been converted from an $H^+$ form (e.g., sulfonic acid or phosphonic acid) to a cationic form, such as $NH_4^+$. In this regard, other efficacious cationic forms can be formed by reacting the $H^+$ form filter material with ammonium hydroxides (and halides), $C_1$-$C_6$ alkylammonium hydroxides, phosphonium hydroxide, $C_1$-$C_6$ alkyl phosphonium hydroxides, $C_1$-$C_6$ imidazolium hydroxides, and pyridinium hydroxides. For example, commercially-available strong cation exchange filters such as Protego® Plus DI (Entegris, Inc.) filters can be treated (i.e., flushed) with, for example, 14% $NH_4OH$, followed by rinsing with water and either utilized wet or dried. Accordingly, in one aspect, the disclosure provides a membrane comprising at least one strong acid functional group having a cationic counterion which is other than $H^+$.

Alternately, in the method of the disclosure a filter media such as Lewatit® S 100 $NH_4$ gel-type cation exchange resin (Lanxess) may be utilized to remove undesired metal cations from liquid compositions, while minimizing the formation of color bodies and dimeric and oligomeric species in such liquid compositions which contain ketones.

Fluid compositions can be passed through or over the filter material of the disclosure to effectively remove metal contaminants to levels suitable for a desired application. One application which can use the filter materials and methods of the disclosure is semiconductor manufacturing, such as for the purification of metals from solutions that are used for etching and cleaning semiconductor materials. Given the selectivity of their purification capabilities, the filter materials and methods of the disclosure are particularly useful in photolithography in general. Advantageously, the filter materials and methods of the disclosure effectively remove undesired amounts of metal contaminants from such fluids, including ketones such as cyclohexanone, while at the same time not causing the formation of appreciable amounts of color bodies and dimeric/oligomeric condensation species thereof, which consequence is a current shortcoming of strongly acidic ion exchange resins and membranes.

In one embodiment, metal contaminants to be removed using the filter materials and methods of the disclosure include Li, B, Na, Mg, Al, Ca, Ti, V, Cr, Mn, Fe, Ni, Cu, Zn, Mo, Cd, Sn, Ba, and Pb ions, either individually or in combinations of two or more thereof.

In one embodiment, the metal ions to be removed are chosen from iron, chromium, manganese, aluminum, and nickel cations.

The filter material can be made of any suitable material or combination of materials. For example, exemplary filter materials can include one or more of a polymer, a metal, a ceramic, or a natural material. Further, in some aspects, the material of the filter can have a chemistry suitable for attachment of a coating having the functionality of chelation or ion exchange.

As used herein, a "filter," refers to an article having a structure that includes filter material. For example, the filter can be in any useful form for a filtering process, including the form of a porous non-woven membrane, a bead, a tube, etc., the filter being made from one or more filter materials such as polymers, including synthetic and natural polymers, metal-containing materials, such as alloys, natural materials, ceramic, carbon fiber, etc.

The filter can be in any desired form suitable for a filtering application. Material that forms the filter can be a structural component of a filter itself and that provides the filter with a desired architecture. The filter can be porous or non-porous and can be of any desired shape or configuration. The filter per se can be a unitary article such as a non-woven fiber or can be represented by a plurality of individual articles, such as particles (e.g., resin beads).

In some embodiments, the filter material is formed from a polymeric material, a mixture of different polymeric materials, or a polymeric material and a non-polymeric material. In certain embodiments, the polymeric material is in the form of a non-woven fiber, forming a membrane. In certain embodiments, the filter material is in the form of beads. Polymeric materials forming the filter can be cross-linked together to provide a filter structure with a desired degree of integrity. Such polymeric materials form the backbone for the ion exchange functional groups which serve to actively filter the metal ion contaminants.

Polymeric materials that can be used to form filter material of filters of the disclosure include various polymers. In some embodiments, the filter material is a membrane and includes a polyolefin or a halogenated polymer. Exemplary polyolefins include polyethylene (PE), polypropylene (PP), polymethylpentene (PMP), polybutene (PB), polyisobutylene (PIB), and copolymers of two or more of ethylene, propylene, and butylene. In a further particular embodiment, filter material includes ultra-high molecular weight polyethylene (UPE). UPE filter materials, such as UPE membranes, are typically formed from a resin having a molecular weight (weight average molecular weight) greater than about $1 \times 10^6$ Daltons (Da), such as in the range of about $1 \times 10^6$-$9 \times 10^6$ Da, or $1.5 \times 10^6$-$9 \times 10^6$ Da. Crosslinking between polyolefin polymers such as polyethylene can be promoted by use of heat or crosslinking chemicals, such as peroxides (e.g., dicumyl peroxide or di-tert-butyl peroxide), silanes (e.g., trimethoxyvinylsilane), or azo ester compounds (e.g., 2,2'-azo-bis(2-acetoxy-propane). Exemplary halogenated polymers include polytetrafluoroethylene (PTFE), polychlorotrifluoro-ethylene (PCTFE), fluorinated ethylene polymer (FEP), polyhexafluoropropylene, and polyvinylidene fluoride (PVDF).

In other embodiments, the filter material includes a polymer chosen from ultra high molecular weight polyethylenes, polyamide, polyimide, polysulfone, polyether-sulfone, polyarylsulfone polyamides, polyacrylates, polymethacrylates, polyesters, nylons, celluloses, cellulose esters, polycarbonates, polystyrenes, poly(styrene-divinyl benzene), or combinations thereof.

In other embodiments, the filter can be a composite filter, which is comprised of a first filter membrane of the disclosure, used in combination with a filter membrane which is different from the first filter membrane.

The cation exchange functional group(s) can be attached to the filter material via coating techniques. For example, a sulfonic acid functional group can be introduced at the surface of the filter material (e.g., a filter membrane) by immersing the material to a mixture of a monomer solution comprising 0.3% Irgacure 2959 (UV catalyst), acrylamidomethylpropane sulfonic acid (AMPS), methylene bis acrylamide (MBAm) cross linker, methanol, and water, and thereafter exposing the thus-coated filter material to ultraviolet radiation to effect curing (i.e., crosslinking) of the coating. The filter material so prepared will thus possess sulfonic acid functional groups, which can then be reacted (i.e., exchanged) with for example, ammonium hydroxide or ammonium chloride to provide the filter materials of the disclosure. Filter materials having phosphonic acid groups can be similarly prepared by utilizing vinyl phosphonic acid.

As noted above, in a first aspect, the disclosure provides a membrane comprising at least one strong acid functional group having a cationic counterion which is other than H+.

In a second aspect, the disclosure provides a method of removing one or more metal(s) or metal ion(s) from a liquid composition, the method comprising:
  (i) contacting a filter material with a liquid composition comprising at least one ketone and one or more metals or metal ions, the filter material comprising at least one strong acid functional group having a cationic counterion which is other than H+; and
  (ii) reducing an amount of the one or more metals or metal ions in the liquid composition, thereby providing a purified liquid composition.

As noted above, certain acid-sensitive materials such as ketone solvents, tend to form dimeric and oligomeric condensation species after exposure to strong acid functional resins and membranes, but when such acid functional resins and membranes are exchanged with various cations, the ability to remove metal anions is not adversely affected, and the creation of these unwanted by-products is greatly reduced. In one embodiment, this result manifests itself in an empirical observation insofar as the liquid compositions comprising ketone(s), when filtered as per this disclosure will exhibit a clear or water white appearance for up to seven days after exposure to the filter materials of the disclosure; this result thus stands in stark contrast to the result in the case of such liquid compositions when exposed to strong acid-functional filter materials, which tend to turn dark over a period of a few days, due to the formation of these dimeric and oligomeric condensation species. Additionally, the liquid compositions comprising such ketones can be measured via GC-MS (gas chromatography-mass spectroscopy) for the presence of such dimeric and oligomeric condensation species prior to filtration to provide a baseline concentration (i.e., the "control" as referred to herein), and then compared to the presence of such species in a liquid composition after exposure to the filter materials of the disclosure in the form of a ratio as follows:
  (dimer plus oligomer):control.

When making this determination for the presence of dimeric and oligomeric (cyclohexanone) condensation species, observed multiple peaks from the GC-MS spectra identify as cyclohexanone "dimers" are compounds consistent with cyclohexanone dimer (2X monomer molecular weight and its derivatives, such as the dimer which has lost two protons or the dimer which has lost an $H_2O$ molecule.

The observed multiple peaks which identify as cyclohexanone "oligomers" are compounds related to cyclohexanone and with retention time higher than cyclohexanone dimer.

Accordingly, in one embodiment, the disclosure provides the membranes as described herein, wherein contacting the membrane with a liquid composition comprising at least one ketone for seven days leads to the liquid composition having an increase in the sum of dimeric and oligomeric condensation species in the liquid composition in a range from greater than 0% to less than 100% as compared to the sum of dimeric and oligomeric condensation species in the liquid composition before it is contacted with the membrane.

Further details on the determination of this ratio are set forth in the Examples below.

In certain embodiments, this ratio may be about 2:1, about 1.5:1, about 1.3:1, about 1.1:1 or about 1.01:1.

As noted above, the modified filter materials can be used to remove metal and metal ion contaminants from an organic solvent. Some specific, non-limiting, examples of solvents that can be filtered using a filter membrane as described include: n-butyl acetate (nBA), isopropyl alcohol (IPA), 2-ethoxyethyl acetate (2EEA), a xylene, cyclohexanone, ethyl lactate, isopentyl ether, methyl-2-hydroxyisobutyrate, methyl isobutyl carbinol (MIBC), methyl isobutyl ketone (MIBK), isoamyl acetate, undecane, propylene glycol methyl ether (PGME), propylene glycol monomethyl ether acetate (PGMEA), and a mixed solution of propylene glycol monomethyl ether (PGME) and PGMEA having a (7:3) mixing ratio and a surface tension of 27.7 mN/m).

For example, in some modes of practice, a solvent may be obtained having an amount of metal ion and/or metal containing impurities that are higher than desired for a target application, such as cleaning solvents, or solvents for resist stripping applications in lithography, for formation of an integrated circuit. For example, the metal impurities can be present in a total amount of greater than 0.001 µg/L (1000 parts per trillion (ppt)), greater than 0.005 µg/L (5000 ppt), greater than 0.01 µg/L (10,000 ppt), or greater than 0.05 µg/L (50,000 ppt) in the solvent. The solvent is then passed through the filter materials of the disclosure to remove metal contaminants and to provide a filtered solvent having an amount of metals that is lower than the amount of metals in the starting solvent. In certain modes of practice the filter of the disclosure can remove an amount of about 25% (wt) or greater, about 30% (wt) or greater, about 35% (wt) or greater, about 40% (wt) or greater, about 45% (wt) or greater, about 50% (wt) or greater, about 55% (wt) or greater, about 60% (wt) or greater, about 65% (wt) or greater, about 70% (wt) or greater, about 75% (wt) or greater, about 80% (wt) or greater, about 85% (wt) or greater, about 90% (wt) or greater, or about 95% (wt) or greater, any one or more metals from the starting solvent.

As noted above, the filter materials of the disclosure provide excellent removal of various metals, while also limiting the formation of dimeric and oligomeric condensation species when ketones are present. Accordingly, in another aspect, the disclosure provides a liquid composition comprising at least one ketone, wherein said composition comprises:
  a. less than about 1000 parts per trillion total of metal ions chosen from Li, B, Na, Mg, Al, Ca, Ti, V, Cr, Mn, Fe, Ni, Cu, Zn, Mo, Cd, Sn, Ba, and Pb ions, either individually or in combinations of two or more thereof; and
  b. a ratio of (dimer plus oligomer of said ketone):monomeric ketone of less than about 2:1.

It will be appreciated that in this aspect, the denominator of the ratio represents the liquid composition comprising the at least one ketone which has not been exposed to the filter material of the disclosure. In other words, this denominator represents the purity of the starting material composition prior to filtration.

The solvents that are treated to remove metal contaminants can be passed through the filters under desired conditions, such as those that enhance removal of metal contaminant from the fluid stream. In some modes of practice, the solvent is passed through the filter at a temperature of about 160° C. or less, 120° C. or less, or 80° C. or less.

The passage of solvent through the filter membranes of the disclosure is not limited to any particular flow rate provided an essentially flux-independent metal impurity removal is achieved and a useful pressure drop for the application is provided. The area of the porous membrane used can be chosen to provide a device with an acceptable pressure drop and essentially flux independent chelation binding for the flow rate and process requirements of the application. In various embodiments, the membrane area can be about 0.25 cm$^2$ or greater, and the specified or fixed area used to determine pressure drop for each membrane to meet the requirements of the application.

In some modes of practice, filters including porous membrane of the disclosure can remove particulates, metal-containing or other, from the fluid stream. Particle retention can be evaluated by measuring the number of test particles removed from a fluid stream by a membrane placed in the fluid stream. By one method, particle retention can be measured by passing a sufficient amount of an aqueous feed solution of 0.1% Triton™ X-100 (DOW), containing 8 ppm polystyrene particles (0.025 μm Green Fluorescent Polymer Microspheres, Fluoro-Max (available from ThermoFisher SCIENTIFIC)), to achieve 0.5, 1, and 2% monolayer coverage through the membrane at a constant flow of 7 milliliters per minute, and collecting the permeate. The concentration of the polystyrene particles in the permeate can be calculated from the absorbance of the permeate. Particle retention is then calculated using the following equation:

$$\text{particle retention} = \frac{[\text{feed}] - [\text{filtrate}]}{[\text{feed}]} \times 100\%.$$

In addition, a filter membrane as described can be characterized by a flow rate or flux of a flow of liquid through the filter membrane. The flow rate must be sufficiently high to allow the filter membrane to be efficient and effective for filtering a flow of fluid through the filter membrane. A flow rate, or as alternately considered, a resistance to a flow of liquid through a filter membrane, can be measured in terms of flow rate or flow time (which is an inverse to flow rate). A filter membrane as described herein including the polycarboxyl ligand can in certain embodiments have a relatively low flow time, for example in combination with a bubble point that is relatively high, and good filtering performance (e.g., as measured by particle retention). An example of a useful or preferred flow time can be below about 8,000 seconds/500 mL, e.g., below about 4,000/500 mL, below about 2,000 seconds/500 mL, below about 1,000 seconds/500 mL, below about 500 seconds/500 mL, or below about 200 seconds/500 mL.

Membrane water flow time can be determined by cutting membranes into 47 mm disks and wetting with water before placing the disk in a filter holder attached to a reservoir for holding a volume of water. The reservoir is connected to a pressure regulator. Water is flowed through the membrane under 14.2 psi (pounds per square inch) differential pressure. After equilibrium is achieved, the time for 500 mL of water to flow through the membrane is recorded.

As one example, FIG. 1 shows filter component 30, which is a product of pleated cylindrical component 10 and end piece 22, with other optional components. Cylindrical component 10 includes a filter membrane 12, as described herein, and is pleated. End piece 22 is attached (e.g., "potted") to one end 15 of cylindrical filter component 10. End piece 22 can preferably be made of a melt-processable polymeric material. A core (not shown) can be placed at the interior opening 24 of cylindrical filter component 10, and a cage (not shown) can be placed about the exterior of cylindrical filter component 10. A second end piece (not shown) can be attached ("potted") to the second end of cylindrical filter component 10. The resultant pleated cylindrical component with two opposed potted ends and optional core and cage can then be placed into a filter housing that includes an inlet and an outlet and that is configured so that an entire amount of a fluid entering the inlet must necessarily pass through filtration membrane 12 before exiting the filter at the outlet.

EXAMPLES

Example 1) Preparation of 0.2 Um Pore Size UPE Membrane with Negatively Charged Surface Coating This example demonstrates the preparation of a 0.2 um pore size UPE membrane with a stable surface coating that has sulfonic acid ion-exchange groups.

A monomer solution was prepared by mixing 0.3% Irgacure 2959, 5.6% Acrylamidomethylpropane sulfonic acid (AMPS), 2.5% methylene bis acrylamide (MBAm) cross linker, 10% Methanol, and 81.6% water and stirring till a fully dissolved homogenous solution was obtained. An exchange solution comprising 10% hexylene glycol and 90% water was prepared.

In a representative experiment, 47 mm disk of UPE porous membrane (28 psi average mean bubble point in IPA, and 80 um thickness (Entegris, Inc.)) was wet with isopropanol solution for 25 sec. The IPA wet membrane disk was immediately placed into the exchange solution and remained submerged for 60 seconds in order to exchange out the isopropanol with 10% hexylene glycol. The exchanged membrane disk was then immediately placed into the monomer solution remained submerged for 60 seconds in order to imbibe the membrane disk with monomer solution. Next, the membrane disk imbibed with monomer was immediately placed with in between polyethylene sheets and excess solution was removed by rolling a rubber roller over the polyethylene/membrane disk/polyethylene sandwich as it lays flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 10 feet per minute. After emerging from the UV unit, the membrane was removed from the sandwich and immediately placed in DI water, where it was washed by swirling for 5 minutes. Next, the treated membrane sample was washed in methanol for 5 minutes. Following this washing procedure, the membrane was dried on a holder in a convection oven operating at 60° C. for 10 min. The membrane ion exchangeable groups were titrated using acid/base (HCl/NaOH) titration and determined to be 4.04 meq H+/m$^2$.

Example 2) Characterization of a Non-Woven Bearing Sulfonic Acid Ion Exchange Groups This example demonstrates the characterization of a commercially available non-woven polyethylene material with sulfonic acid ion-exchange groups.

A non-woven polyethylene material with sulfonic acid ion-exchange groups (Entegris, Inc.) was obtained and cut into 47 mm disks. The disks of the non-woven ion-exchange material where measured to be about 200 um thick. The ion exchangeable groups of the disks were titrated using acid/base (HCl/NaOH) titration and determined to be greater than 100 meq H+/m$^2$.

Example 3) Detrimental Impact on Cyclohexanone Purity and Color by Exposure to PE Non-Woven and UPE 0.2 Um Membrane Bearing Sulfonic Acid Ion Exchange Groups This example demonstrates detrimental impact on purity and color due to exposing cyclohexanone to non-woven and UPE membrane bearing sulfonic acid ion exchange groups. This exposure causes undesirable discoloration of the non-woven and membrane material, discoloration of the exposed cyclohexanone, and formation of impurities identified as dimers and oligomers.

A 0.2 um pore size UPE membrane with a stable surface coating that has sulfonic acid ion-exchange groups in their H+ form was prepared similar to Example 1 and cut into disks. A non-woven polyethylene material with sulfonic acid ion-exchange groups in their H+ form similar to Example 2 was obtained and cut into disks. A 40 mL glass scintillation vial was filled with high purity cyclohexanone and two disks of non-woven polyethylene material with sulfonic acid ion-exchange groups in their H+ form were placed into the vial. A separate vial was filled with high purity cyclohexanone and two disks of 0.2 um pore size UPE membrane with a stable surface coating that has sulfonic acid ion-exchange groups was placed into the vial. Separately a 40 mL glass scintillation vial was filled with high purity cyclohexanone and no non-woven disks were added, this sample functions as a negative no-exposure control. The samples were allowed to soak at room temperature for 7 days at which point the samples where inverted a few times to make sure solution was uniformly mixed and an aliquot sample of the cyclohexanone was taken. Upon visual inspection you could see that the non-woven had turned light brown and the non-woven exposed cyclohexanone solution had turned clear yellow, the UPE membrane turned tan with colorless solution, whereas the cyclohexanone not exposed to the non-woven remained its original clear colorless solution. In order to determine the impact of cyclohexanone exposure to the non-woven bearing sulfonic acid ion exchange groups the sample aliquots of exposed and non-exposed cyclohexanone was immediately run on GC-MS. The results from GC-MS are able to quantify the formation of dimers and oligomers due to exposure to the non-woven and membrane. The cyclohexanone monomers, dimers, and oligomers can be expressed by sum of the cyclohexanone dimer and oligomer peak areas of the treated sample and dividing by the sum of dimer and oligomer peak areas from untreated cyclohexanone straight from the bottle. With this analysis the higher the ratio number of cyclohexanone dimer+oligomer (Treated/Control) the more dimeric and oligomeric impurities are present in the solution. In this manner, the relative amounts of the dimeric and oligomeric condensation species, as indicated by GC-MS, formed as a consequence of exposure to the filter membrane can be quantified by subjecting the samples to gas chromatography-mass spectroscopy analysis and integration of the peaks associated with each species. See Table 1 for the result.

TABLE 1

Impact on cyclohexanone purity and color by exposure to PE non-woven and UPE 0.2 um membrane bearing sulfonic acid ion exchange groups.

| Sample | Cyclohexanone solution color observation | Membrane/non-woven disk color observation | Cyclohexanone dimer + oligomer (Treated/Control) |
|---|---|---|---|
| No exposure control | Clear colorless | Not applicable | 1.0 |
| UPE membrane w/ sulfonic acid groups | Clear colorless | Turned from white to light tan | 413 |
| Non-woven polyethylene material w/sulfonic acid ion-exchange | Clear yellow | Turned from light yellow to light brown | 1793 |

The results shown in Table 1 above indicated that the membranes changed color after exposure to the cyclohexanone solution and also resulted in a significant increase of cyclohexanone dimers and oligomers.

Example 4) Mitigation of Detrimental Impact on Cyclohexanone Purity and Color by Exposure to PE Non-Woven and UPE 0.2 Um Membrane Bearing Sulfonic Acid Ion Exchange Groups by Pretreatment of the Membrane and Non-Woven with Ammonium Hydroxide This example demonstrates the ability to mitigate the detrimental impact on purity and color due to exposing cyclohexanone to non-woven and UPE membrane bearing sulfonic acid ion exchange groups. The mitigation is achieved by pretreating the membrane and non-woven with ammonium hydroxide.

An experiment was conducted the same as Example 3 except the membrane and non-woven disks where treated with ammonium hydroxide and dried prior to soaking in cyclohexanone by the following method. First, the membrane and non-woven bearing sulfonic acid ion exchange groups were cut into disks, pre-wet in isopropanol, exchanged into de-ionized water, and immediately submerged in 14% ammonium hydroxide. The disks were allowed to soak in 14% ammonium hydroxide for 1 hour. After 1 hour exposure the disks were rinsed in de-ionized water and dried in holders at 60° C. for 15 min in a convection oven. These ammonium hydroxide pretreated disks were removed from the drying oven and used for a remainder of a cyclohexanone soaking experiment carried out exactly like Example 3. The results are shown in Table 2 below.

TABLE 2

Impact on cyclohexanone purity and color by exposure to PE non-woven and UPE 0.2 um membrane bearing sulfonic acid ion exchange groups.

| Sample | Cyclohexanone solution color observation | Membrane/non-woven disk color observation | Cyclohexanone dimer + oligomer (Treated/Control) |
|---|---|---|---|
| No exposure control* | Clear colorless | Not applicable | 1.0 |
| UPE membrane w/ sulfonic acid groups pretreated with ammonium hydroxide | Clear colorless | No color change observed | 1.1 |
| Non-woven polyethylene material w/sulfonic acid ion-exchange pretreated with ammonium hydroxide | Clear colorless | No color change observed | 1.3 |

*Represents cyclohexanone which has not been subjected to filtration or otherwise contacted with the filter membrane of the disclosure.

The results shown above in Table 2 indicate that in comparison to the results shown in Table 1, treating the membranes with ammonium hydroxide resulted in the membranes not changing color due to exposure to the cyclohexanone solution and also lowered the increase in cyclohexanone dimers and oligomer in the cyclohexanone solution. Indeed, there was only a 10% increase in the sum of cyclohexanone dimers and oligomers for the UPE membrane compared to the cyclohexanone control solution and only a 30% increase in the sum of cyclohexanone dimers and oligomers for the non-woven polyethylene material compared to the cyclohexanone solution. Thus, this example demonstrates that membranes treated as described herein to have at least one strong acid functional group having a cationic counterion which is other than $H^+$ have the characteristic that contacting the membrane with a liquid composition comprising at least one ketone for seven days leads to the liquid composition having an increase in the sum of dimeric and oligomeric condensation species in the liquid composition in a range from greater than 0% to less than 100% as compared to the sum of dimeric and oligomeric condensation species in the liquid composition before it is contacted with the membrane.

Example 5) Reduction of Metals in Cyclohexanone by 0.2 Um Pore Size UPE Membrane with Negatively Charged Surface Coating that has been Pretreated with Ammonium Hydroxide This example demonstrates the ability of negatively charged 0.2 um UPE membranes to maintain metal reduction capability in cyclohexanone when the membranes are treated with either HCl or $NH_4OH$ as demonstrated in Table 3 below.

Negatively charged 0.2 um UPE membranes were prepared using a method similar to Examples 1 and cut into 47 mm membrane disks. These membrane disks were conditioned by washing several times with 10% HCl followed by soaking in 10% HCl overnight and equilibrated with deionized water. Some of the disks were treated with 14% ammonium hydroxide similar to Example 4. High purity cyclohexanone (TOK America, Inc.) was spiked with CONOSTAN Oil Analysis Standard with a target metal concentration of 1.5 ppb per metal and 20 mL was dispensed into a clean 25 mL PFA jar (Savillex). In one jar containing the metal spiked cyclohexanone a 47 mm disk of HCl cleaned and dried negatively charged 0.2 um UPE membrane was placed. In a separate jar containing the metal spiked cyclohexanone a 47 mm disk of HCl cleaned and ammonium hydroxide treated and dried negatively charged 0.2 um UPE membrane was placed. Both the samples where gently rotated for 16 hours so that the membranes have 16 hour contact time with the metal spiked solvent. After 16 hours the PFA jars were uncapped and the membranes were carefully removed and discarded. The metal concentration for the metal spiked cyclohexanone and each membrane exposed sample was determined using ICP-MS. The results are depicted in Table 3.

TABLE 3

Reduction of metals in cyclohexanone by 0.2 um pore size UPE membrane with negatively charged surface coating that has been pretreated with ammonium hydroxide.

| Metals | Metal Spiked Cyclohexanone (ppb) | Metal spiked cyclohexane exposed to negatively charged membrane pretreated w/HCl (ppb) | Metal spiked cyclohexane exposed to negatively charged membrane pretreated w/14% ammonium hydroxide (ppb) |
|---|---|---|---|
| Li | 0.069 | 0.077 | 0.066 |
| B  | 0.860 | 0.616 | 0.439 |
| Na | 2.062 | 0.118 | 0.026 |
| Mg | 1.220 | 0.204 | <0.000 |
| Al | 1.332 | 0.002 | 0.034 |
| Ca | 1.223 | 0.265 | 0.042 |
| Ti | 1.146 | 0.027 | 0.065 |
| V  | 1.572 | 0.037 | 0.484 |
| Cr | 1.465 | 0.196 | 0.256 |
| Mn | 1.790 | 0.080 | <0.000 |
| Fe | 2.004 | 2.004 | 0.339 |
| Ni | 1.267 | 0.204 | 0.031 |
| Cu | 1.653 | <0.000 | 0.197 |
| Zn | 2.083 | 0.059 | 0.922 |
| Mo | 1.394 | 0.368 | 0.668 |
| Cd | 2.189 | 0.311 | 1.219 |
| Sn | 1.573 | 0.432 | 0.208 |

TABLE 3-continued

Reduction of metals in cyclohexanone by 0.2 um pore size UPE membrane with negatively charged surface coating that has been pretreated with ammonium hydroxide.

| Metals | Metal Spiked Cyclo-hexanone (ppb) | Metal spiked cyclohexane exposed to negatively charged membrane pretreated w/HCl (ppb) | Metal spiked cyclohexane exposed to negatively charged membrane pretreated w/14% ammonium hydroxide (ppb) |
|---|---|---|---|
| Ba | 1.028 | 0.094 | 0.059 |
| Pb | 2.306 | 0.023 | 0.055 |
| Total | 28.237 | 5.118 | 5.112 |

Example 6) Preparation of 0.2 Um Pore Size UPE Membrane with Positively Charged Surface Coating This example demonstrates the preparation of a 0.2 um pore size UPE membrane with a stable surface coating that has quaternary amine ion-exchange groups.

A monomer solution was prepared by mixing 0.3% Irgacure 2959, 5.0% (3-Acrylamidopropyl)trimethylammonium chloride (APTAC), 2.25% methylene bis acrylamide (MBAm) cross linker, 10% Methanol, and 82.45% water and stirring till a fully dissolved homogenous solution was obtained. An exchange solution comprising 10% hexylene glycol and 90% water was prepared.

In a representative experiment, 47 mm disk of UPE porous membrane (28 psi average mean bubble point in IPA, and 80 um thickness Entegris, Inc.) was wet with isopropanol solution for 25 sec. The IPA wet membrane disk was immediately placed into the exchange solution and remained submerged for 60 seconds in order to exchange out the isopropanol with 10% hexylene glycol. The exchanged membrane disk was then immediately placed into the monomer solution remained submerged for 60 seconds in order to imbibe the membrane disk with monomer solution. Next, the membrane disk imbibed with monomer was immediately placed with in between polyethylene sheets and excess solution was removed by rolling a rubber roller over the polyethylene/membrane disk/polyethylene sandwich as it lays flat on a table. The polyethylene sandwich was then taped to a transport unit which conveyed the assembly through a Fusion Systems broadband UV exposure lab unit emitting at wavelengths from 200 to 600 nm. Time of exposure was controlled by how fast the assembly moves through the UV unit. In this example, the assembly moved through the UV chamber at 10 feet per minute. After emerging from the UV unit, the membrane was removed from the sandwich and immediately placed in DI water, where it was washed by swirling for 5 minutes. Next, the treated membrane sample was washed in methanol for 5 minutes. Following this washing procedure, the membrane was dried on a holder in a convection oven operating at 60° C. for 10 min. The membrane ion exchangeable groups were titrated using acid/base (HCl/NaOH) titration and determined to be 3.7 meq OH-/m².

Example 7) Reduction of Metals in Cyclohexanone by Dual Layer 0.2 Um Pore Size UPE Membranes with Negatively Charged and Positively Charged Surface Coatings that has been Pretreated with Ammonium Hydroxide This example demonstrates the ability of dual layers, one negatively charged and one positively charged, 0.2 um UPE membranes to maintain metal reduction capability in cyclohexanone when the membranes are treated with either HCl or NH₄OH as demonstrated in Table 4 below. Negatively charged 0.2 um UPE membranes were prepared using a method similar to Example 1 and cut into 47 mm membrane disks. Positively charged 0.2 um UPE membranes were prepared using a method similar to Example 6 and cut into 47 mm membrane disks. These membrane disks were conditioned by washing several times with 10% HCl followed by soaking in 10% HCl overnight and equilibrated with deionized water. Some of the disks were treated with 14% ammonium hydroxide similar to Example 4. High purity cyclohexanone (TOK America, Inc.) was spiked with CONOSTAN Oil Analysis Standard with a target metal concentration of 1.5 ppb per metal and 20 mL was dispensed into a clean 25 mL PFA jar (Savillex). In one jar containing the metal spiked cyclohexanone both a 47 mm disk of HCl cleaned and dried negatively charged 0.2 um UPE and similarly cleaned positively charged 0.2 um UPE membrane was placed. In a separate jar containing the metal spiked cyclohexanone both a cleaned 47 mm disk of ammonium hydroxide treated and dried negatively charged 0.2 um UPE and similarly cleaned and ammonium hydroxide treated positively charged 0.2 um UPE membrane was placed. Both the samples where gently rotated for 16 hours so that the membranes have 16 hour contact time with the metal spiked solvent. After 16 hours the PFA jars were uncapped and the membranes were carefully removed and discarded. The metal concentration for the metal spiked cyclohexanone and each membrane exposed sample was determined using ICP-MS. The results are depicted in Table 4.

TABLE 4

Reduction of metals in cyclohexanone by dual layer 0.2 um pore size UPE membranes with negatively charged and positively charged surface coatings that has been pretreated with ammonium hydroxide.

| Metals | Metal Spiked Cyclo-hexanone (ppb) | Metal spiked cyclohexane exposed to negatively charged and positively charged pretreated w/HCl (ppb) | Metal spiked cyclohexane exposed to negatively charged and positively charged membrane pretreated w/14% ammonium hydroxide (ppb) |
|---|---|---|---|
| Li | 0.069 | 0.065 | 0.066 |
| B | 0.860 | 0.383 | 0.024 |
| Na | 2.062 | 0.038 | 0.002 |
| Mg | 1.220 | <0.000 | <0.000 |
| Al | 1.332 | <0.000 | <0.000 |
| Ca | 1.223 | <0.000 | <0.000 |
| Ti | 1.146 | 0.003 | <0.000 |
| V | 1.572 | <0.000 | <0.000 |
| Cr | 1.465 | 0.004 | <0.000 |
| Mn | 1.790 | 0.007 | <0.000 |
| Fe | 2.004 | 0.291 | <0.000 |
| Ni | 1.267 | <0.000 | <0.000 |
| Cu | 1.653 | <0.000 | <0.000 |
| Zn | 2.083 | <0.000 | <0.000 |
| Mo | 1.394 | 0.003 | <0.000 |
| Ag | 4.357 | <0.000 | <0.000 |
| Sn | 1.573 | 0.036 | 0.014 |
| Ba | 1.028 | 0.026 | 0.026 |
| Pb | 2.306 | 0.045 | 0.049 |
| Total | 30.406 | 0.900 | 0.181 |

Example 8) Example Determination of Ratios of
Cyclohexanone Dimer+Oligomer (Treated/Control)

The relative amounts of dimers and oligomers present in solution, for cyclohexanone (CHN) was determined as follows:
1. The peak area of CHN dimer is the sum of all the compound identified as "dimers", and the peak area of CHN oligomer is the sum of all the compounds identified as "oligomers".
2. The total peak area is the sum of CHN dimer and CHN oligomer.
3. The dilution factor is how much the sample was diluted before the GCMS analysis.
4. The corrected peak area is the total peak area times the dilution factor.
5. The corrected peak area of the CHN control was normalized as 1, and the ratio is the corrected peak area of the sample over the corrected peak area of the CHN control.

An example calculation of ratios of cyclohexanone (CHN) dimers plus oligomers vs. control is shown in Table 5 below using the control and UPE membrane with sulfonic acid groups from Table 1 in Example 3.

TABLE 5

Example calculation from control and "UPE membrane w/sulfonic acid groups" form Table 1

| Sample | Cyclohexanone Untreated Control | Cyclohexanone Treated Sample |
|---|---|---|
| CHN dimer Peak Area | 3987984.14 | 295931659 |
| CHN Oligomer Peak Area | 3196802.91 | 1100583.1 |
| Total Peak Area | 7184787.05 | 297032242 |
| Dilution factor | 1 | 10 |
| Corrected Peak Area | 7184787.05 | 2.97E+09 |
| Ratio Cyclohexanone dimer + oligomer (Treated/Control) | 1.0 | 413 |

ASPECTS

In a first aspect, the disclosure provides a membrane comprising at least one strong acid functional group having a cationic counterion which is other than $H^+$.

In a second aspect, the disclosure provides the membrane of the first aspect, wherein the cationic counterion is chosen from ammonium, $C_1$-$C_6$ alkylammonium, cyclohexylammonium, phosphonium, $C_1$-$C_6$ alkyl phosphonium, imidazolium, pyridinium, guanidinium, sulfonium, pyrrolidinium, morpholinium, and pyrimidinium.

In a third aspect, the disclosure provides the membrane of the first or second aspect, wherein the strong acid functional group is chosen from sulfonic acid and/or phosphonic acid groups.

In a fourth aspect, the disclosure provides the membrane of any of the first through third aspects, wherein contacting the membrane with a liquid composition comprising at least one ketone for seven days leads to the liquid composition having an increase in the sum of dimeric and oligomeric condensation species in the liquid composition in a range from greater than 0% to less than 100% as compared to the sum of dimeric and oligomeric condensation species in the liquid composition before it is contacted with the membrane.

In a fifth aspect, the disclosure provides a method of removing one or more metal(s) or metal ion(s) from a liquid composition, said liquid composition comprising at least one ketone, the method comprising:
(i) contacting a filter material with a liquid composition comprising at least one ketone and one or more metals or metal ions, the filter material comprising at least one strong acid functional group having a cationic counterion which is other than H+; and
(ii) reducing an amount of the one or more metals or metal ions in the liquid composition, thereby providing a purified liquid composition.

In a sixth aspect, the disclosure provides the method of the fifth aspect, wherein the filter material comprises a membrane.

In a seventh aspect, the disclosure provides the method of the fifth aspect, wherein the filter material is in the form of a resin bead.

In an eighth aspect, the disclosure provides the method of any one of the fifth through the seventh aspects, wherein said purified liquid composition maintains a water white appearance for up to 7 days upon storage in an inert atmosphere.

In a ninth aspect, the disclosure provides the method of any one of the fifth through the eighth aspects, wherein contacting the membrane with a liquid composition comprising at least one ketone for seven days leads to the liquid composition having an increase in the sum of dimeric and oligomeric condensation species in the liquid composition in a range from greater than 0% to less than 100% as compared to the sum of dimeric and oligomeric condensation species in the liquid composition before it is contacted with the membrane.

In a tenth aspect, the disclosure provides the method of any one of the fifth through the ninth aspects, wherein the liquid composition comprises a ketone chosen from cyclohexanone and methyl isobutyl ketone.

In an eleventh aspect, the disclosure provides the method of any one of the fifth through the tenth aspects, wherein the liquid composition further comprises one or more of n-butyl acetate, isopropyl alcohol, 2-ethoxyethyl acetate, xylene, ethyl lactate, isopentyl ether, methyl-2-hydroxyisobutyrate, methyl isobutyl carbinol, isoamyl acetate, undecane, propylene glycol methyl ether, propylene glycol monomethyl ether acetate, and a mixed solution of propylene glycol monomethyl ether (PGME) and PGMEA having a (7:3) mixing ratio and a surface tension of 27.7 mN/m.

In a twelfth aspect, the disclosure provides the method of the eleventh aspect, wherein the liquid composition comprises isopropyl alcohol.

In a thirteenth aspect, the disclosure provides the method of any one of the fifth through the twelfth aspects 5 to 12, wherein the cationic counterion is chosen from ammonium, $C_1$-$C_6$ alkylammonium, cyclohexylammonium, phosphonium, $C_1$-$C_6$ alkyl phosphonium, imidazolium, pyridinium, guanidinium, sulfonium, pyrrolidinium, morpholinium, and pyrimidinium.

In a fourteenth aspect, the disclosure provides the method of any one of the fifth through the twelfth aspects, wherein the one or more metal or metal ions are chosen from Li, B, Na, Mg, Al, Ca, Ti, V, Cr, Mn, Fe, Ni, Cu, Zn, Mo, Cd, Sn, Ba, and Pb metals or metal ions, either individually or in combinations of two or more thereof.

In a fifteenth aspect, the disclosure provides the method of any one of fifth through the fourteenth aspects, wherein the metal ions are chosen from iron, chromium, manganese, aluminum, and nickel cations.

In a sixteenth aspect, the disclosure provides a filter comprising a strong acid cation exchange membrane, said membrane comprising at least one strong acid functional group having a cationic counterion which is other than $H^+$.

In a seventeenth aspect, the disclosure provides the filter of the sixteenth aspect, wherein the cationic counterion is chosen from ammonium, $C_1$-$C_6$ alkylammonium, phosphonium, $C_1$-$C_6$ alkyl phosphonium, imidazolium, pyridinium, guanidinium, sulfonium, pyrrolidinium, and pyrimidinium.

In an eighteenth aspect, the disclosure provides the filter of either the sixteenth or seventeenth aspects, wherein the strong acid functional group is chosen from sulfonic acid and/or phosphonic acid groups.

In a nineteenth aspect, the disclosure provides a filter comprising a strong acid cation exchange resin in the form of a bead, said resin comprising at least one strong acid functional group having a cationic counterion which is chosen from $C_1$-$C_6$ alkylammonium, phosphonium, $C_1$-$C_6$ alkyl phosphonium, imidazolium, pyridinum, guanidinium, sulfonium, pyrrolidinium, and pyrimidinium.

In a twentieth aspect, the disclosure provides a composite filter comprising:
a first filter material and a second filter material, an output facing surface of the first filter material in contact with an input facing surface of the second filter material, wherein the first filter material or the second filter material possesses a membrane comprising at least one strong acid functional group having a cationic counterion which is other than $H^+$;
and the second filter material is different from the first filter material.

In a twenty-first aspect, the disclosure provides a liquid composition comprising a filtered ketone, wherein said composition comprises:
a. less than about 1000 parts per trillion total of metal ions chosen from Li, B, Na, Mg, Al, Ca, Ti, V, Cr, Mn, Fe, Ni, Cu, Zn, Mo, Cd, Sn, Ba, and Pb ions, either individually or cumulatively; and
b. a ratio of dimeric and oligomeric condensation species of said ketone:monomeric ketone of less than about 2:1.

In a twenty-second aspect, the disclosure provides a liquid composition comprising a filtered ketone, wherein said composition comprises:
a. less than about 500 parts per trillion total of metal ions chosen from Li, B, Na, Mg, Al, Ca, Ti, V, Cr, Mn, Fe, Ni, Cu, Zn, Mo, Cd, Sn, Ba, and Pb ions, either individually or cumulatively; and
b. a ratio of dimeric and oligomeric condensation species of said ketone:monomeric ketone of less than about 2:1.

In a twenty-third aspect, the disclosure provides a liquid composition comprising a filtered ketone, wherein said composition comprises:
a. less than about 100 parts per trillion total of metal ions chosen from Li, B, Na, Mg, Al, Ca, Ti, V, Cr, Mn, Fe, Ni, Cu, Zn, Mo, Cd, Sn, Ba, and Pb ions, either individually or cumulatively; and
b. a ratio of dimeric and oligomeric condensation species of said ketone:monomeric ketone of less than about 2:1.

In a twenty-fourth aspect, the disclosure provides the composition of any one of the twenty-first through the twenty-third aspects, wherein the ketone is chosen from cyclohexanone and methyl isobutyl ketone.

In a twenty-fifth aspect, the disclosure provides the composition of any one of the twenty-first through the twenty-fourth aspects, wherein the ratio is less than about 1.3:1.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A method of removing one or more metals or metal ions from a liquid composition, the method comprising:
   (i) contacting a filter material with the liquid composition, wherein the liquid composition comprises at least one ketone and the one or more metals or metal ions, wherein the filter material comprises at least one strong acid functional group having a cationic counterion, wherein the strong acid functional group is selected from the group consisting of sulfonic acid, phosphonic acid, and combinations thereof, and wherein the cationic counterion is selected from the group consisting of ammonium, C1-C6 alkylammonium, cyclohexylammonium, phosphonium, $C_1$-$C_6$ alkyl phosphonium, imidazolium, pyridinium, guanidinium, sulfonium, pyrrolidinium, morpholinium, and pyrimidinium; and
   (ii) reducing an amount of the one or more metals or metal ions in the liquid composition to provide a purified liquid composition.

2. The method of claim 1, wherein the filter material comprises a membrane.

3. The method of claim 1, wherein the filter material is in the form of a resin bead.

4. The method of claim 1, wherein said purified liquid composition maintains a water white appearance for up to 7 days upon storage in an inert atmosphere.

5. The method of claim 1, wherein contacting the membrane with a liquid composition comprising at least one ketone for seven days leads to the liquid composition having an increase in the sum of dimeric and oligomeric condensation species in the liquid composition in a range from greater than 0% to less than 100% as compared to the sum of dimeric and oligomeric condensation species in the liquid composition before it is contacted with the membrane.

6. The method of claim 1, wherein the liquid composition comprises a ketone selected from the group consisting of cyclohexanone and methyl isobutyl ketone.

7. The method of claim 1, wherein the liquid composition further comprises one or more of n-butyl acetate, isopropyl alcohol, 2-ethoxyethyl acetate, xylene, ethyl lactate, isopentyl ether, methyl-2-hydroxyisobutyrate, methyl isobutyl carbinol, isoamyl acetate, undecane, propylene glycol methyl ether, propylene glycol monomethyl ether acetate, and a mixed solution of propylene glycol monomethyl ether (PGME) and PGMEA having a (7:3) mixing ratio and surface tension of 27.7 mN/m.

8. The method of claim 7, wherein the liquid composition comprises isopropyl alcohol.

9. The method of claim 1, wherein the one or more metal or metal ions are selected from the group consisting of Li, B, Na, Mg, Al, Ca, Ti, V, Cr, Mn, Fe, Ni, Cu, Zn, Mo, Cd, Sn, Ba, and Pb metals or metal ions, and combinations thereof.

10. The method of claim 1, wherein the metal ions are selected from the group consisting of iron, chromium, manganese, aluminum, and nickel cations.

11. The method of claim 1, wherein the strong acid functional group is sulfonic acid and wherein the cationic counterion is ammonium.

* * * * *